(12) United States Patent
MacDonald

(10) Patent No.: US 11,821,255 B2
(45) Date of Patent: *Nov. 21, 2023

(54) DOOR ASSEMBLY

(71) Applicant: Endura Products, LLC, Colfax, NC (US)

(72) Inventor: Kevin T. MacDonald, Greensboro, NC (US)

(73) Assignee: Endura Products, LLC, Colfax, NC (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/985,637

(22) Filed: Aug. 5, 2020

(65) Prior Publication Data

US 2020/0362072 A1 Nov. 19, 2020

Related U.S. Application Data

(63) Continuation of application No. 15/715,434, filed on Sep. 26, 2017, now Pat. No. 11,015,000, which is a
(Continued)

(51) Int. Cl.
*E06B 1/32* (2006.01)
*E06B 1/52* (2006.01)
(Continued)

(52) U.S. Cl.
CPC .............. *E06B 1/32* (2013.01); *C08F 10/00* (2013.01); *C08F 210/06* (2013.01); *C08J 5/18* (2013.01); *C08L 23/14* (2013.01); *C08L 23/142* (2013.01); *E06B 1/34* (2013.01); *E06B 1/524* (2013.01); *C08F 210/16* (2013.01); *C08F 2420/00* (2013.01); *C08F 2500/01* (2013.01); *C08F 2500/03* (2013.01); *C08F 2500/11* (2013.01); *C08F 2500/16* (2013.01); *C08F 2500/17* (2013.01); *C08F 2500/20* (2013.01); *C08F 2500/26* (2013.01); *C08F 2800/10* (2013.01); *C08J 2323/10* (2013.01); *C08L 2203/00* (2013.01); *C08L 2203/16* (2013.01);
(Continued)

(58) Field of Classification Search
None
See application file for complete search history.

(56) References Cited

U.S. PATENT DOCUMENTS 3,591,985 A * 7/1971 Coppins .................... E06B 1/64
49/504
3,800,488 A * 4/1974 Swanson ............... E06B 3/9685
52/212
(Continued)

*Primary Examiner* — Joshua K Ihezie
(74) *Attorney, Agent, or Firm* — Womble Bond Dickinson (US) LLP

(57) ABSTRACT

A door assembly. The door assembly may include at least one door panel and a door frame having a plurality of frame members including a header and a pair of side jambs. The invention may also be considered a frame member. The frame member may include a core; and a two-piece top piece adjoining the core to form a structural member. The core and the top piece may be a composite of cellulosic material and at least one other material. The door assembly may further include at least one adjacent panel. Also disclosed are door jamb frame members and mullion frame members.

20 Claims, 15 Drawing Sheets

Related U.S. Application Data continuation of application No. 15/176,421, filed on Jun. 8, 2016, now Pat. No. 9,803,413.

(60) Provisional application No. 62/175,808, filed on Jun. 15, 2015.

(51) Int. Cl.

| | |
|---|---|
| *E06B 1/34* | (2006.01) |
| *C08F 10/00* | (2006.01) |
| *C08F 210/06* | (2006.01) |
| *C08J 5/18* | (2006.01) |
| *C08L 23/14* | (2006.01) |
| *E06B 3/70* | (2006.01) |
| *C08F 210/16* | (2006.01) |

(52) U.S. Cl.
CPC ..... *C08L 2205/025* (2013.01); *C08L 2205/03* (2013.01); *C08L 2207/04* (2013.01); *C08L 2207/12* (2013.01); *C08L 2314/06* (2013.01); *E06B 2003/7049* (2013.01); *Y10T 428/1397* (2015.01)

(56) References Cited

U.S. PATENT DOCUMENTS

| | | | | |
|---|---|---|---|---|
| 3,943,679 | A * | 3/1976 | Dissinger | E06B 3/5892 52/473 |
| 4,281,480 | A | 8/1981 | Wendt | 49/504 |
| 4,439,965 | A | 4/1984 | Langenhorst | 52/211 |
| 5,058,323 | A | 10/1991 | Gerritsen | 49/504 |
| 5,203,130 | A | 4/1993 | Freelove | 52/211 |
| 5,412,909 | A * | 5/1995 | Wu | E06B 1/347 49/460 |
| 5,435,106 | A | 7/1995 | Garries et al. | 52/204.5 |
| 5,491,951 | A | 2/1996 | Rigelman | 52/309.16 |
| 5,511,355 | A | 4/1996 | Dingler | 52/729.5 |
| 5,528,869 | A * | 6/1996 | Boomer | E06B 1/30 49/505 |
| 5,634,303 | A | 6/1997 | Ellingson | 52/210 |
| 5,758,458 | A | 6/1998 | Ridge | |
| 5,759,680 | A | 6/1998 | Brooks | |
| 5,836,118 | A * | 11/1998 | Thornton | E06B 1/045 49/504 |
| 5,873,209 | A * | 2/1999 | Hagel | E06B 1/52 52/656.4 |
| 5,987,843 | A * | 11/1999 | Canfield | E06B 1/32 49/504 |
| 6,003,277 | A | 12/1999 | Graham et al. | 52/309.7 |
| 6,125,605 | A | 10/2000 | Young | 52/717.01 |
| 6,148,582 | A | 11/2000 | Ellingson | 52/656.4 |
| 6,266,933 | B1 * | 7/2001 | Park | E06B 1/30 52/210 |
| 6,282,851 | B1 * | 9/2001 | Beaton | E06B 1/12 52/204.1 |
| 6,286,274 | B1 * | 9/2001 | McKann | E06B 1/20 49/505 |
| 6,298,555 | B1 * | 10/2001 | Vincenti | E04F 19/061 138/DIG. 4 |
| 6,308,476 | B1 * | 10/2001 | Nakamoto | E06B 1/6076 52/204.1 |
| 6,378,266 | B1 | 4/2002 | Ellingson | 52/656.4 |
| 6,453,631 | B1 | 9/2002 | Headrick | 52/210 |
| 6,557,309 | B1 | 5/2003 | Johnson | 52/210 |
| 6,604,334 | B2 | 8/2003 | Rochman | 52/717.01 |
| 6,766,621 | B2 | 7/2004 | Reppermund | 52/204.1 |
| 6,922,969 | B1 | 8/2005 | Mina | 52/738.1 |
| 7,160,601 | B2 | 1/2007 | Ellingson | 428/158 |
| 7,603,825 | B2 * | 10/2009 | Dohren | E04C 3/29 52/309.16 |
| 7,765,768 | B2 * | 8/2010 | Liang | E06B 3/74 52/784.1 |
| 7,930,866 | B2 | 4/2011 | Carlson et al. | 52/834 |
| 8,069,622 | B2 * | 12/2011 | Mees | E06B 3/988 52/213 |
| 8,178,643 | B2 | 5/2012 | Edstrom et al. | 528/60 |
| 8,230,652 | B2 | 7/2012 | An | 52/210 |
| 8,266,856 | B2 | 9/2012 | Carlson et al. | 52/309.16 |
| 8,438,808 | B2 | 5/2013 | Carlson et al. | 52/309.16 |
| 8,499,509 | B2 | 8/2013 | Sibbett | 52/211 |
| 8,857,107 | B1 | 10/2014 | Key | 49/460 |
| 9,784,029 | B2 * | 10/2017 | Grondin | E06B 7/2316 |
| 9,803,413 | B2 * | 10/2017 | MacDonald | C08L 23/14 |
| 9,845,633 | B2 * | 12/2017 | Wang | E06B 3/223 |
| 10,202,794 | B1 * | 2/2019 | Careri | E06B 1/524 |
| 10,227,794 | B1 * | 3/2019 | Martin, Jr. | E05B 17/2003 |
| 10,480,240 | B2 * | 11/2019 | Toll | E06B 3/70 |
| 10,718,151 | B2 * | 7/2020 | MacDonald | E06B 1/30 |
| 10,801,248 | B2 * | 10/2020 | MacDonald | E06B 1/28 |
| 10,851,579 | B2 * | 12/2020 | Thomson | E06B 1/34 |
| 11,015,000 | B1 * | 5/2021 | MacDonald | C08L 23/14 |
| 11,047,164 | B2 * | 6/2021 | MacDonald | E06B 1/10 |
| 11,072,968 | B1 * | 7/2021 | Downs, Jr. | E06B 1/30 |
| 2002/0174610 | A1 | 11/2002 | Bennett | E06B 1/06 52/204.1 |
| 2005/0204657 | A1 * | 9/2005 | Ellingson | E04G 21/30 52/204.1 |
| 2005/0257455 | A1 | 11/2005 | Fagar | |
| 2006/0123720 | A1 | 6/2006 | Liu | 52/211 |
| 2007/0074469 | A1 | 4/2007 | Plagemann | |
| 2008/0178553 | A1 * | 7/2008 | Micho | E06B 1/06 52/656.4 |
| 2009/0044471 | A1 * | 2/2009 | Harlin | E06B 3/825 52/309.13 |
| 2009/0255197 | A1 | 10/2009 | Chapman | 52/210 |
| 2010/0192489 | A1 * | 8/2010 | An | E06B 1/32 52/210 |
| 2011/0138714 | A1 | 6/2011 | Van Seters | 52/204.5 |
| 2012/0073240 | A1 * | 3/2012 | An | E06B 3/222 52/844 |
| 2012/0090735 | A1 * | 4/2012 | Reid | E06B 1/06 144/333 |
| 2012/0137605 | A1 * | 6/2012 | Sibbett | E06B 1/32 52/204.1 |
| 2016/0280819 | A1 | 9/2016 | Tohi | |
| 2017/0241190 | A1 * | 8/2017 | MacDonald | C08F 10/00 |
| 2018/0258684 | A1 * | 9/2018 | MacDonald | E06B 1/10 |
| 2019/0128048 | A1 * | 5/2019 | MacDonald | E06B 3/22 |

* cited by examiner

DOOR ASSEMBLY

This application is a continuation of application Ser. No. 15/715,434, filed Sep. 26, 2017, which in a continuation of application Ser. No. 15/176,421 filed Jun. 8, 2016, which claims the benefit of Provisional Application No. 62/175,808, filed Jun. 15, 2015, which are each herein incorporated by reference in their entireties.

FIELD OF TECHNOLOGY

The present disclosure relates generally to entranceways for a building and, more particularly, to a door assembly for a residence and to frame members.

BACKGROUND

Frame components for exterior door systems are exposed to environmental elements and extremes such as moisture, temperature, and sunlight, which can attack and break down the frame material. Protective coatings such as exterior grade paints are typically used not only to improve appearance but also to protect the underlying material, which is traditionally and typically wood. These frame components are also prone to wicking up moisture from their bottom ends. This type of moisture can lead to decay over time, which compromises the appearance and structural integrity of the frame. Alternates to a traditional wood frame include aluminum cladded wood frames, which can be expensive, vinyl film cladded wood frames, which are not very resistant to impact damage, or all plastic extruded frames, which are not very rigid and are also susceptible to deformation under heat.

Thus, there remains a need for a new and improved door assembly and frame members that are decay resistant while, at the same time, has the appearance and strength of a traditional wood frame door assembly.

SUMMARY

The present disclosure is directed in one embodiment to a door assembly. The door assembly includes at least one door panel and a door frame having a plurality of frame members including a header and at least a pair of side jambs. The frame member includes a core; and a two-piece top piece adjoining the core to form a structural member with the core and the top piece is a composite of cellulosic material and at least one other material. The door assembly may further include an adjacent panel. The adjacent panel may be, in one example, at least one side light panel. In other examples, the panel may be a fixed panel.

The core is formed of a non-metallic material and preferably the core is a wood. Also, the core may further include a lower portion formed of a decay resistant material. In one embodiment, the lower portion formed of a decay resistant material is a cellulosic-plastic composite. The cellulosic portion of the cellulosic-plastic composite preferably is wood fiber. Also, the plastic portion of the cellulosic-plastic composite preferably is a thermoplastic. In one embodiment, the thermoplastic is a polyethylene.

The two-piece top piece includes a stop portion and a rabbet portion. In one embodiment, the stop portion and the rabbet portion are generally L-shaped and the proximate end of the stop portion overlaps the corresponding proximate end of the rabbet portion. The overlapping proximate ends of the rabbet portion and the stop portion may form a weather strip slot and may further include a weather strip adapted to be received by the weather strip slot. In addition, the stop portion and the rabbet portion may be generally L-shaped and the distal ends of the stop portion and the rabbet portion each overlap the sides of the underlying core.

In one embodiment, the two-piece top piece is formed of a decay resistant material. The two-piece top piece may be a cellulosic-plastic composite. Preferably, the cellulosic portion of said cellulosic-plastic composite is wood fiber. The plastic portion of the cellulosic-plastic composite preferably is a thermoplastic. In one embodiment, the plastic is a polyvinyl chloride.

The amount of cellulosic material in the cellulosic-plastic composite may be between about 20 wt. % and about 70 wt. % of the weight of the cellulosic-plastic composite. Preferably, in one embodiment, the amount of cellulosic material in the cellulosic-plastic composite is between about 25 wt. % and about 45 wt. % of the weight of the cellulosic-plastic composite. In another embodiment, the amount of cellulosic material in the cellulosic-plastic composite is about 35 wt. % of the weight of the cellulosic-plastic composite.

The thickness of the two-piece top piece may be between about 10% and about 50% of the thickness of the frame member. In other embodiments, the thickness of the two-piece top piece is between about 10% and about 50% of the thickness of the frame member. In one embodiment, the thickness of the two-piece top piece is about 30% of the thickness of the frame member.

The frame member may further include a binder between the core and the two-piece top piece for attaching the core to the two-piece top piece to form the frame member. Preferably, in some examples, the binder is an adhesive. In one embodiment, the adhesive is a hot melt adhesive.

In one embodiment of the door assembly, each adjacent panel adjoins a mullion extending between the header and the base of the door assembly. Also, the door assembly may further include a sill extending underneath the at least one door panel. Further, the at least one door panel may be a raised panel door. In one embodiment, the door panel further includes at least one window panel.

The door assembly may further include hinges located between the door panel and the door frame or a mullion. Also, the door assembly may further include locking hardware to secure the at least one door panel to the door frame.

Accordingly, one aspect of the present disclosure is to provide a door assembly, the door assembly including at least one door panel and a door frame having a plurality of frame members including a header and at least a pair of side jambs; wherein the frame member includes a core and at least one top piece adjoining the core to form a structural member with the core and wherein the top piece is a composite of cellulosic material and at least one other material.

Another aspect of the present disclosure is to provide in a door assembly, including a door frame having a plurality of frame members, including a header and at least a pair of side jambs, the frame member including a core and a two-piece top piece adjoining the core to form a structural member with the core. The top piece, in this embodiment may be a composite of cellulosic material and at least one other material.

Still another aspect of the present disclosure is to provide a door assembly, the door assembly including at least one door panel and a door frame having a plurality of frame members including a header and at least a pair of side jambs. The frame member may include a core and a two-piece top piece adjoining the core to form a structural member with the core and the top piece is a composite of cellulosic material and at least one other material; and at least one side panel. The side panel, by way of example may be a light panel and/or a fixed panel.

Still in other embodiments, the present disclosure may be considered a frame member including a core and a two-piece top piece adjoining the core to form a structural member with the core and the top piece being a composite of cellulosic material and at least one other material.

These and other aspects of the inventions of the present disclosure will become apparent to those skilled in the art after a reading of the following description of embodiments when considered with the drawings.

DESCRIPTION OF EMBODIMENTS

Figure 1:
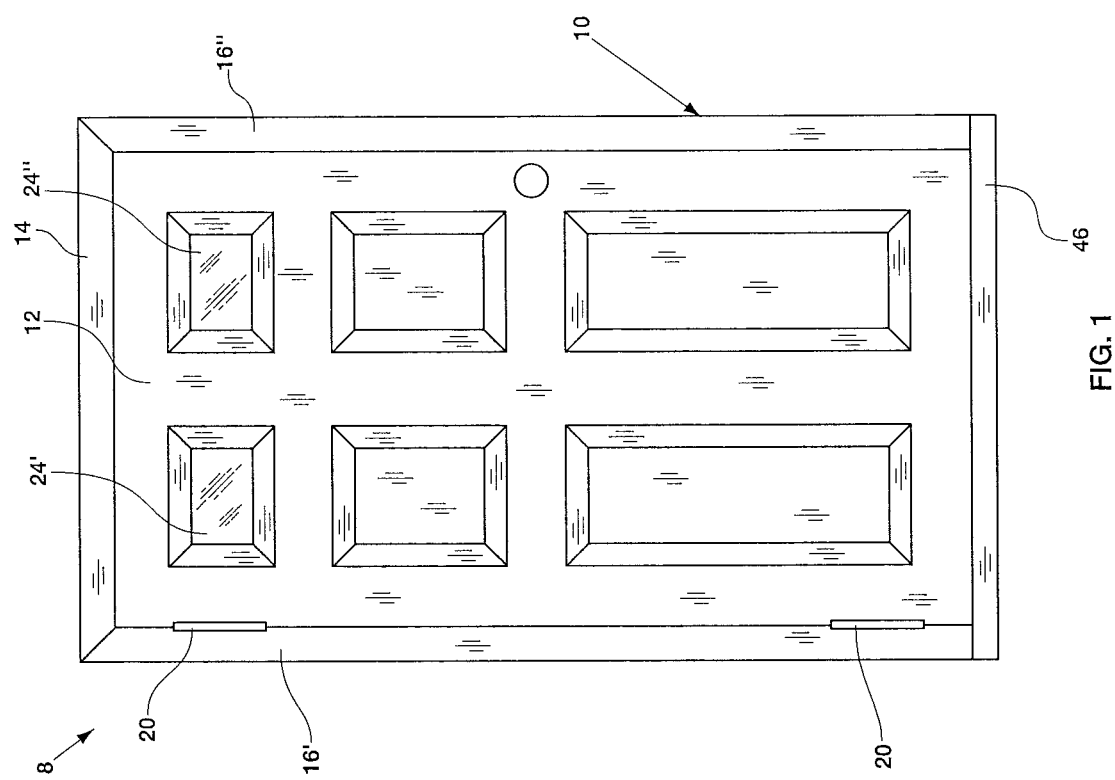
FIG. 1 is a front elevation view of one embodiment of a door assembly constructed according to the present disclosure.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the inventions and are not intended to limit the inventions thereto. As best seen in FIG. 1, a door assembly, generally designated 8, is shown constructed according to the present disclosure. The door assembly 8 includes a door frame 10 and at least one door panel 12.

The door frame 10 may include one or more frame member 29. A plurality of frame members may include any combination of a header 14 and a pair of side jambs 16' and 16". Header 14 may be generally placed toward the top of the door panel 12. Side jambs 16' and 16" may be generally placed at opposing sides of the door panel 12. However, in some embodiments, the side jambs are not directly adjacent to the door panel 12. Door panel 12 may further include hinges 20. Hinges 20 may connect door panel 12 to at least one of the frame members. In another embodiment, hinges 20 may connect door panel 12 to a mullion. There may be one, two, three or more hinges 20.

In other embodiments, the door panel 12 may also include locking hardware that enables the door panel to be secured to at least one of the frame members; for example, side jamb 16". Some examples of locking hardware include latches and deadbolts. Alternatively, door panel 12 may include locking hardware that enables it to be secured to a second door panel. Still in other embodiments, door panel 12 may include locking hardware to secure it to a mullion. More than one type of locking hardware mechanism may be used in certain embodiments; for instance, wherein at least two door panels may be used to constitute a French door assembly. In another embodiment, the door panel 12 is a raised panel door. The door panel 12, in one example, may include adjacent panels, for example, side light panels 42' and 42"(see FIG. 6) and in other examples may include side lite panels. The door panel 12 may also include raised panels, for example, 24' and 24".

Figure 2:
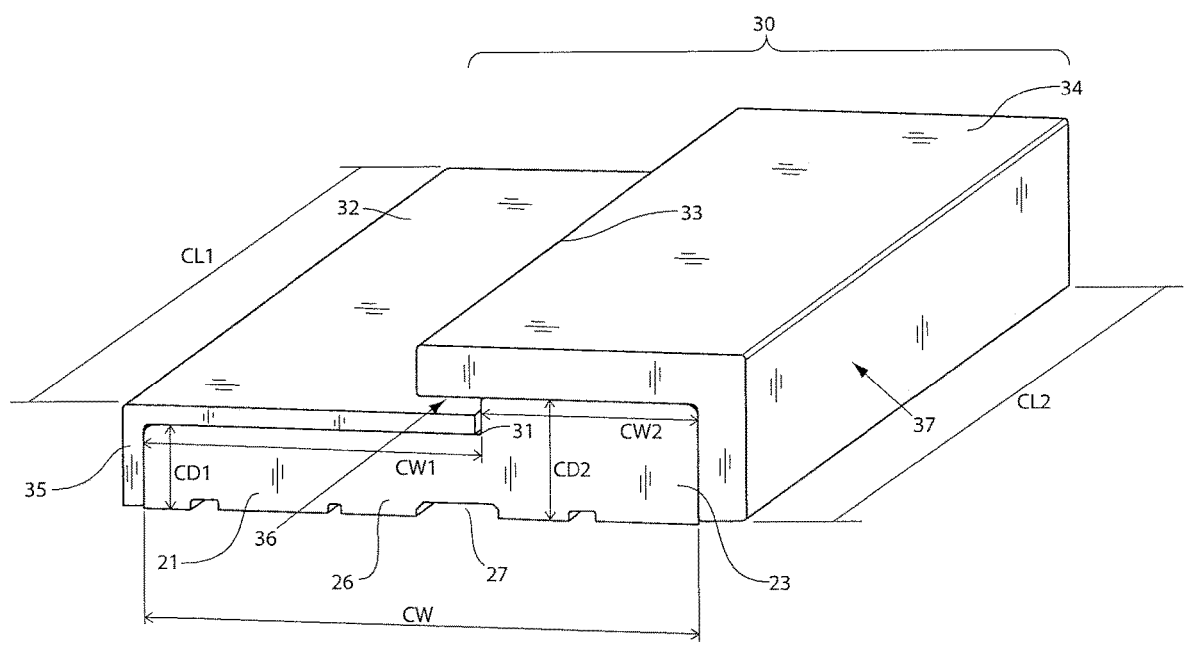
FIG. 2 is an end perspective view of one embodiment of a frame member having a core and a two-piece top piece.
Figure 3:
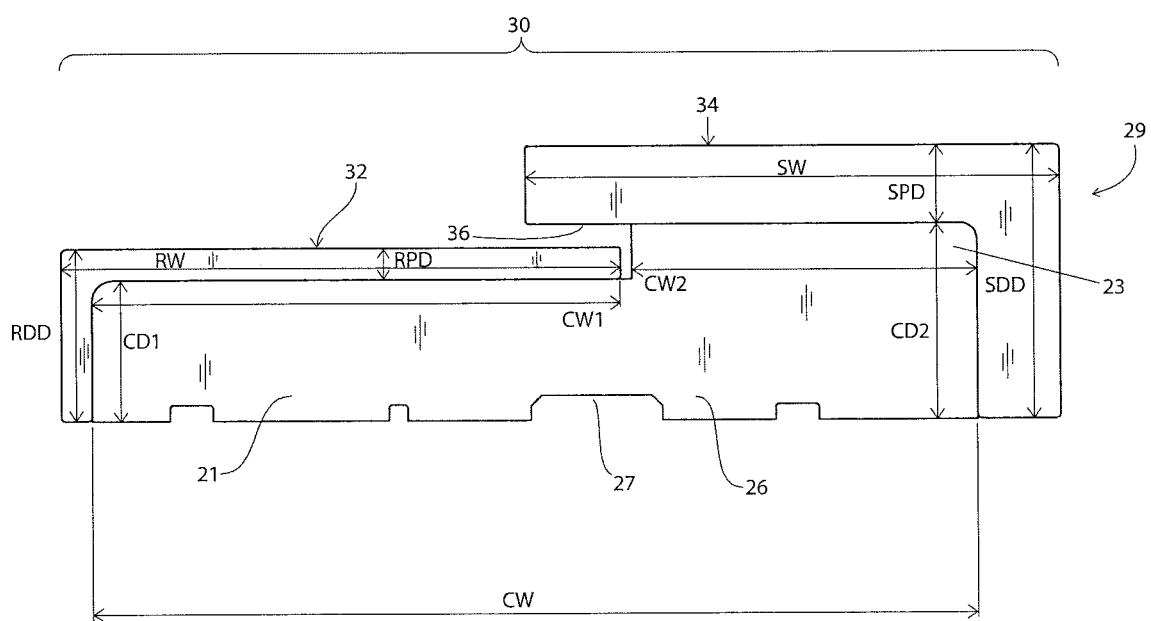
FIG. 3 is an end cross-sectional view of the frame member shown in FIG. 2.

Turning to FIGS. 2 and 3, and in some examples, the frame member 29 may include a core 26 and a top piece 30, as seen in FIGS. 2 and 3. The top piece 30 may include a binder (not shown) that attaches it to the core 26. The binder may be an adhesive. In one embodiment, the binder may be an adhesive such as a hot melt adhesive. Core 26 may be of a material that provides additional structural stability while top piece 30 can be included for structural stability and aesthetic features. Top piece 30 may also serve other functions such as protecting the core 26. The core 26 may further include back out grooves 27 on a face that is not attached to the top piece 30.

In one embodiment, the top piece 30 may be comprised of two separate pieces, first piece and second piece. Other embodiments of top piece 30 may include additional pieces. Still in other embodiments, top piece 30 is a single piece. As shown in the embodiment in FIG. 2, the two piece top piece 30 is comprised of a rabbet portion 32 and a separate stop portion 34. In one embodiment, the two top pieces are generally L-shaped. Other shapes may alternatively be used.

FIGS. 2 and 3 show that the two top pieces may overlap and form a slot 36. The slot 36 may be a weather strip slot that further includes a weather strip 40 (not shown). Weather strips are useful for preventing water and air from entering the interior of a building. The slot 36 may accept the weather strip between the proximate ends 31 and 33.

The core 26 may be of any shape with any defined length ("CL"), width ("CW") and depth ("CD"). FIG. 3 shows the two-piece top members are flexible in design and can accommodate any span of core sizes, including multiple cores. In one embodiment the core width is about 5¼ inches. In another embodiment the core width is about 7¼ inches. In another embodiment, the core width may be from about 5" to about 8". Either the rabbet portion 32, the stop portion 34 or both can be adjusted in their respective widths ("RW" and "SW") to accommodate the core's width to maintain the overlap at the proximate ends 31, 33. In a number of embodiments, the rabbet portion 32 is at a fixed standard width while the stop portion 34 can be accommodating and manufactured at a variety of widths. Still, the rabbet portion 32 may also be manufactured at a variety of widths to accommodate the needs of the application.

In some embodiments, the core 26 may include a partially raised portion 23 to support at least one of the top pieces. This portion may be integrally formed with the core from one core material. Alternatively, this portion may be adjoined from separate components to wholly form the core 26. In the embodiment shown in FIG. 3, the core 26 has a first portion 21 (having a length ("CL1"), width ("CW1") and depth ("CD1")) to support the rabbet portion 32. The core may also include a second raised portion 23 (having a length ("CL2"), width ("CW2") and depth ("CD2")) to support the stop portion 34. The first and second portions of the core 26 may be of any length, width and depth. The second raised portion 23 of the core 26 may enable the stop portion 34 to at least partially overlap the rabbet portion 32. In yet other embodiments, the first and second portions of the core are attached to a single top piece molded to fit both portions of the core 26.

In some embodiments, the stop portion 34 may extend over the rabbet portion 32 to form an overlap. The rabbet portion 32 and stop portion 34 of the two-piece top piece embodiments may overlap in any number of configurations. In one embodiment, the proximate end 33 of the stop portion 34 overlaps with a corresponding proximate end 31 of the rabbet portion 32. In some examples, the proximate end 33 of stop portion 34 meets the proximate end 31 of rabbet portion 32 by about an overlap of about 0" to about ½".

Still in other embodiments, the overlap may be substantially medially located over the core. The location of the overlap with respect to the core 26 may depend on the dimensions of its portions, particularly CW1 and CW2. In some embodiments, CW1 and CW2 may be of widths such that the overlap is closer to a distal end 35 of the rabbet portion 32 than a distal end 37 of the stop portion 34. In other embodiments, the overlap is closer to the distal end 37 of the stop portion 34 than distal end 35.

The extent of overlap may also depend on the depths and widths of the rabbet and stop portions of the top piece. In one embodiment, the stop portion 34 has a greater width ("SW") than the width of the rabbet portion 32 ("RW"). In another embodiment, the proximate end 33 of stop portion 34 has a greater depth ("SPD") than the proximate end 31 of the rabbet portion 32 ("RPD").

The two pieces may also sit on top of the core 26 in a variety of configurations. As shown in FIG. 2, the distal ends 35, 37 of the rabbet portion 32 and stop portion 34 both overlap the sides of the underlying core 26. In one embodiment, the depth of the core ("CD1/CD2"), at least at the core's greatest depth, is greater than the depths of the distal ends 35, 37 of the rabbet portion 32 ("RDD") and stop portion 34 ("SDD"). In other embodiments, the depths of the distal ends 35 and 36 are equal to or greater than the depth of core 26. Furthermore, the depth of distal end 37 may be greater than distal end 35.

In other embodiments, the core 26 is non-metallic. By way of example, the non-metallic material may be wood. The core 26 may also further include a decay resistant material. Decay resistant materials are useful for extending the lifespan of the core, such as through preventing water damage. In one embodiment, the decay resistant material may be a cellulosic-plastic composite. The cellulosic portion of the composite may be wood fiber. The plastic portion of the composite can be a thermoplastic such as polyethylene. In other embodiments, the entire core may include a decay resistant material.

Figure 4:
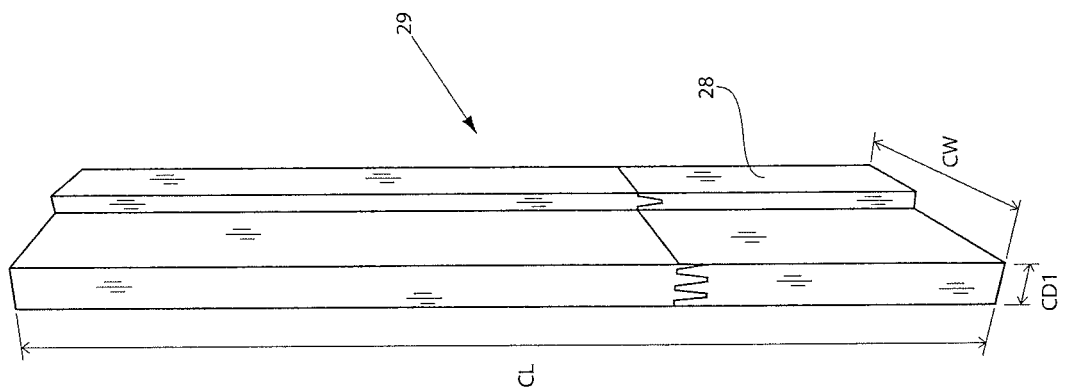
FIG. 4 is a side perspective view of one embodiment of a core including a lower portion.

As seen in FIG. 4, the decay resistant material may be generally located on a lower portion 28 of the core. The lower portion 28 of the core may generally refer to a portion that is closer to the ground. The lower portion 28 may be an integral formed segment as depicted in FIG. 4. This segment can be an extruded profile that matches the profile of the wood core. In the embodiment shown in FIG. 4, the integral segment is joined to the core 26 by a finger joint. However, the decay resistant material may be joined to the core 26 by any mechanical or chemical means and is not limited to connecting via a particular type of joint. Further, the integrally formed segment may be of any length with respect to the core. By way of example, the length of the segment may be about 4".

The top piece 30 may also be a decay resistant material. This decay resistant material may be a cellulosic-plastic composite. In one embodiment, the cellulosic portion of this composite is a wood fiber. In another embodiment, the plastic portion of the composite is a thermoplastic such as polyvinyl chloride.

The amount of cellulosic material may vary within the top piece composite. In one embodiment, the top piece composite is between about 20 weight percent and about 70 weight percent of the weight of the cellulosic-plastic composite. In another embodiment, the amount of cellulosic material within the composite is about 35 weight percent of the total weight of the cellulosic-plastic composite. The thickness of the top piece 30 may also vary among different embodiments of the invention. In one example, the thickness of the top piece 30 is between about 10% and about 50% of the thickness of the total frame member, including the core. In one embodiment, the thickness of the top piece 30 is about 30% of the thickness of the door frame member 29.

Figure 5:
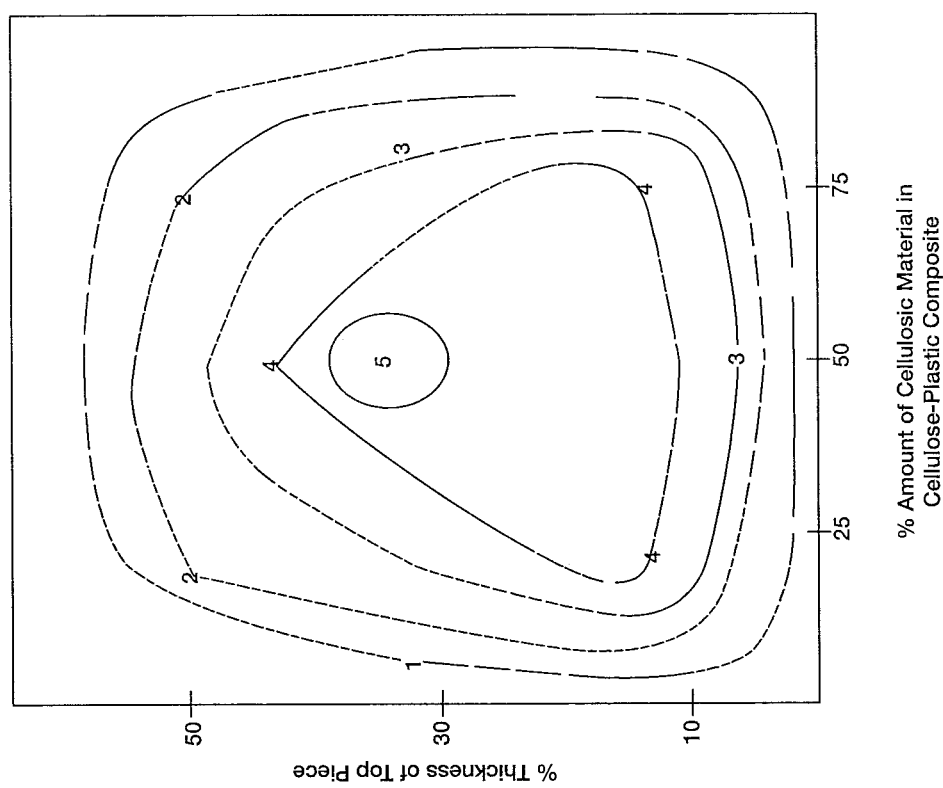
FIG. 5 is a graphical representation of a response surface illustrating the relationship of the thickness of the top piece and the amount of cellulosic material in the cellulose-plastic composite on the performance of a frame member constructed according to the present disclosure.

FIG. 5 is a graphical representation of a response surface illustrating the relationship between the percent thickness of the top piece and the amount of cellulosic material in embodiments where the top piece is a cellulosic-plastic composite. Percent thickness of the top piece is defined as the thickness of the top piece with respect to the total thickness of the frame member. The response surface provides a visual illustration of the effects of both thickness and percent amount of cellulosic material within the composite via a two-dimensional surface plot of a three-dimensional surface. The boundary conditions in FIG. 5 are denoted with dashed lines, and indicate a minimum percent thickness and a percent amount of cellulosic material for use with some examples within the present disclosure.

Accordingly, in this example, the expected characteristics of various embodiments of top piece 30 were plotted and zones on the response surface were ranked from 1 to 5, with 1 being the poorest performing top pieces and 5 being the best performing top pieces in terms of strength, durability and resistance to decay.

Figure 6:
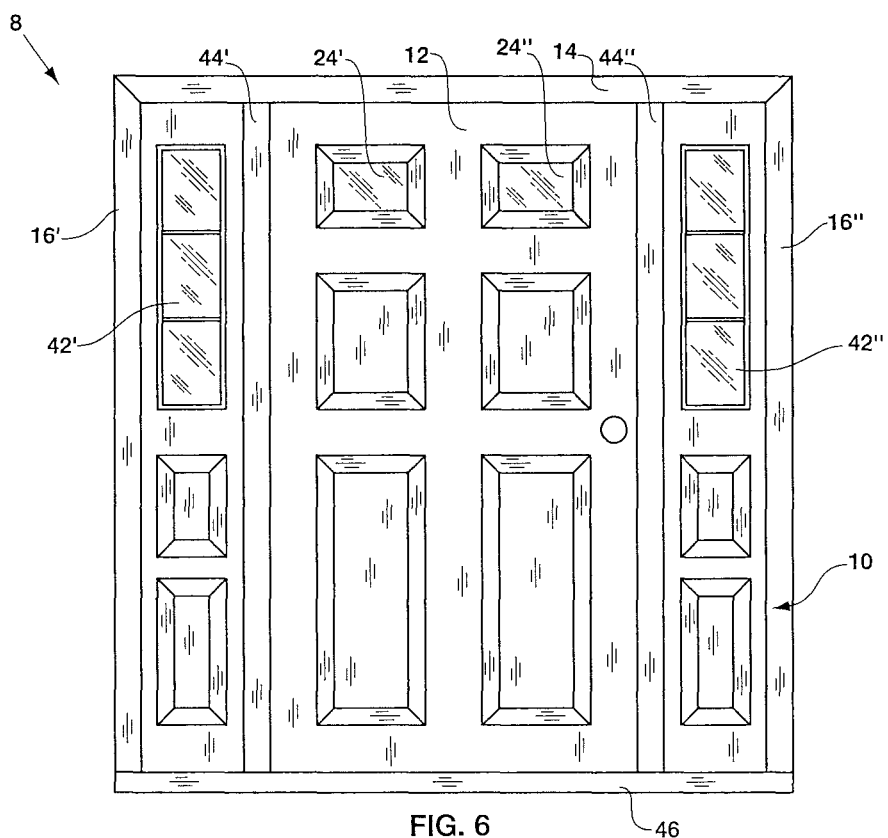
FIG. 6 is a front elevation view of another embodiment of a door assembly constructed according to the present disclosure.
Figure 7:
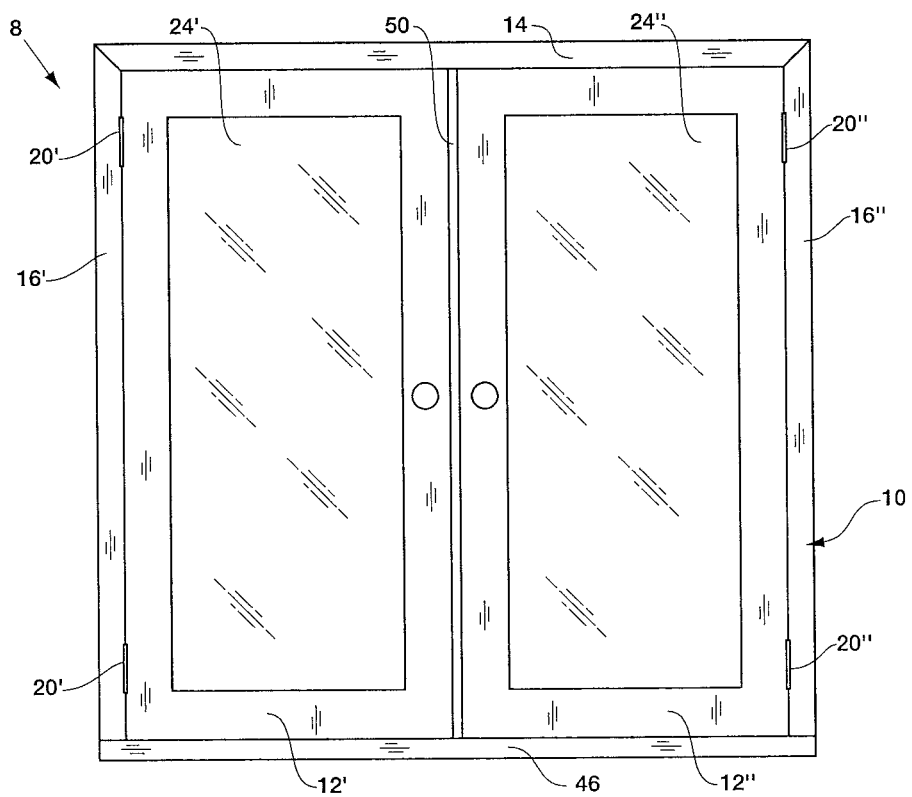
FIG. 7 is a front elevation view of yet another embodiment of a door assembly constructed according to the present disclosure.

These frame members may be a part of any type of door assembly. For instance, the door assembly 8 may include at least one adjacent panel, designated as 42' and 42" in FIG. 6, such as a side lite panel or a fixed panel. In certain embodiments, frame members may also include a mullion 44' and 44". Each adjacent panel may also adjoin a mullion 44' and 44" extending between the header and base of the door assembly 8. The door assembly 8 may further include a sill 46 located underneath the door panel. In other embodiments, as shown in FIG. 7, the door assembly includes two door panels 12' and 12" separated by way of example an astragal and/or a mullion 50. In yet other embodiments, the frame members described herein are not necessarily limited to door jambs and mullions and may alternatively be used for other assemblies such as windows.

Figure 8:
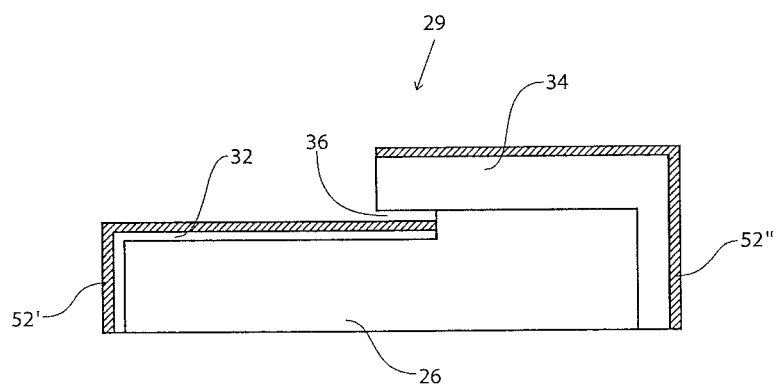
FIG. 8 is an end cross-sectional view of another embodiment of a frame member having a core, a two-piece top piece and capping.

Frame members may also include one or more cappings 52. FIG. 8 illustrates one alternative embodiment wherein the rabbet portion 32 and stop portion 34 each further includes a capping 52 (shown as 52' and 52", respectively). Capping 52 may be co-extruded with top piece 30, and is not necessarily limited to one layer. Alternatively, capping 52 may be independently extruded to fit on top of a frame member and may cover at least a portion of a frame member. In one embodiment, capping 52 is a thermoplastic such as polyvinyl chloride. In another embodiment, capping 52 may be a composite of two or more materials. The composite of capping 52 may be comprised of a thermoplastic with a cellulosic filler such as wood. In other embodiments, capping 52 can be made of plastic without cellulosic filler, with another type of filler, or include a blowing agent.

Figure 9:
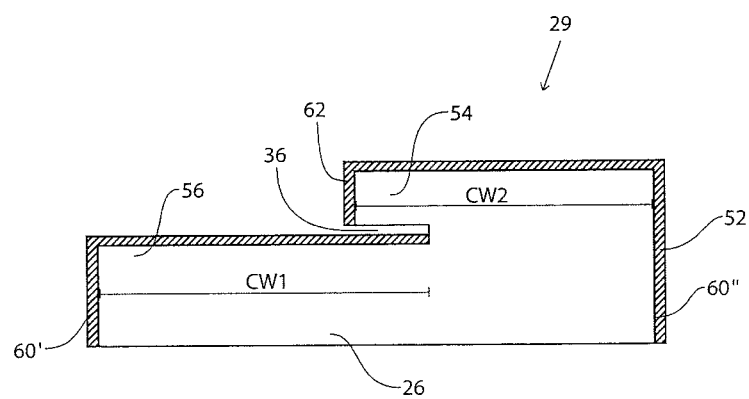
FIG. 9 is an end cross-sectional view of another embodiment of a frame member having a core with an overhanging portion and a two-piece capping.

In other embodiments, such as one shown in FIG. 9, capping 52 may be placed onto core 26 without top piece 30. Capping 52 may comprise two or more pieces, but in other embodiments, may comprise one piece covering at least a portion of core 26. FIG. 9 also shows additional structural variations of the core and capping, including core 26 having an overlapping portion 54 forming slot 36. Overlapping portion 54 may overlap with underlying portion 56 in any number of configurations. By way of example, the overlap may be substantially medially located with respect to the core 26. The location of the overlap with respect to the core 26 may depend on the dimensions of its overlapping and underlying portions, particularly CW1 and CW2. In some embodiments, CW1 and CW2 may be of widths such that the overlap is closer to a distal end 60' or 60" of core 26. Capping 52 may include an overhanging portion 62 that covers at least a portion of the proximal end of overlapping portion 54.

Figure 10:
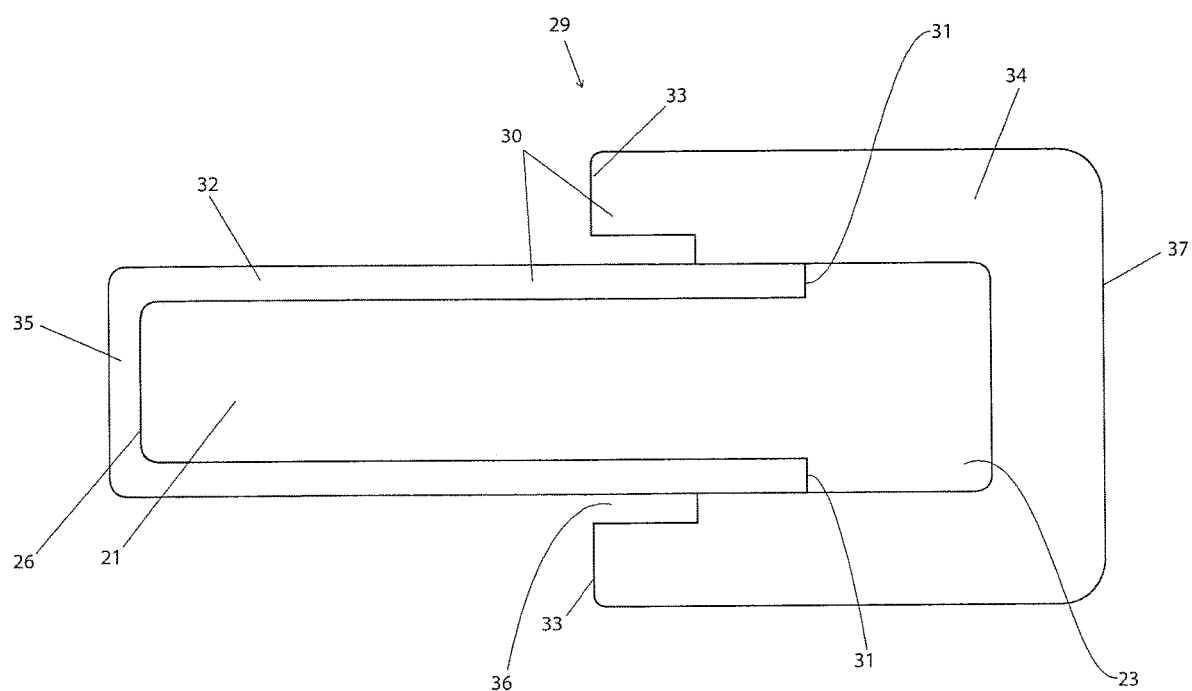
FIG. 10 is an end view of one embodiment of a mullion frame member having a core and two-piece top piece.
Figure 11:
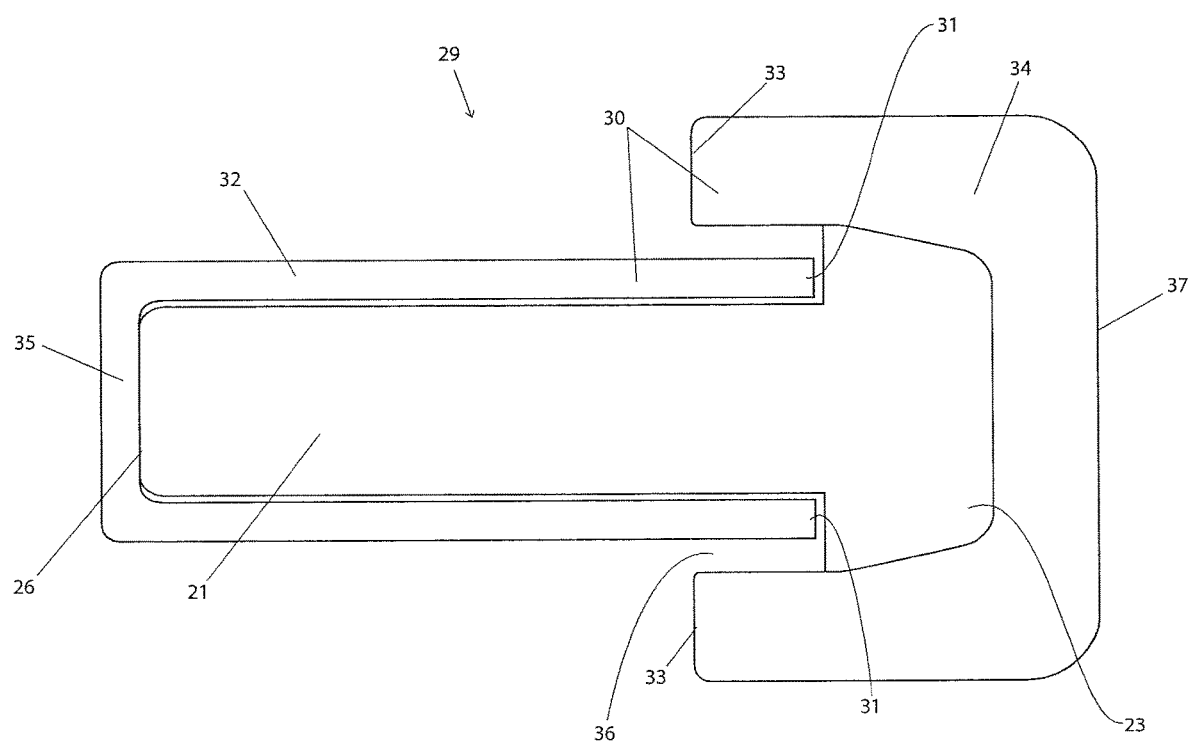
FIG. 11 is an end perspective view of another embodiment of a mullion frame member having a core and two-piece top piece.

FIGS. 10 and 11 show embodiments where at least one frame member is a mullion having a core and two-piece top piece. The mullion frame member may be structured similarly, as described herein throughout, as a jamb frame member, for example, of FIGS. 2, 3, 8 and 9.

Figure 12:
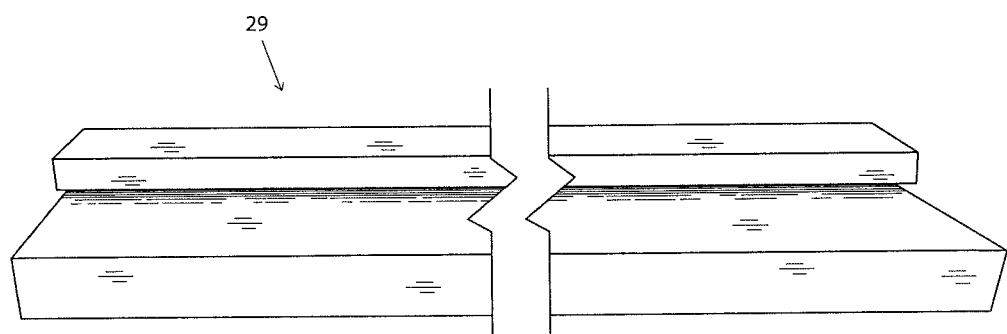
FIG. 12 is a side perspective view of another embodiment of a door jamb according to the FIGS. 2 and 3.
Figure 13:
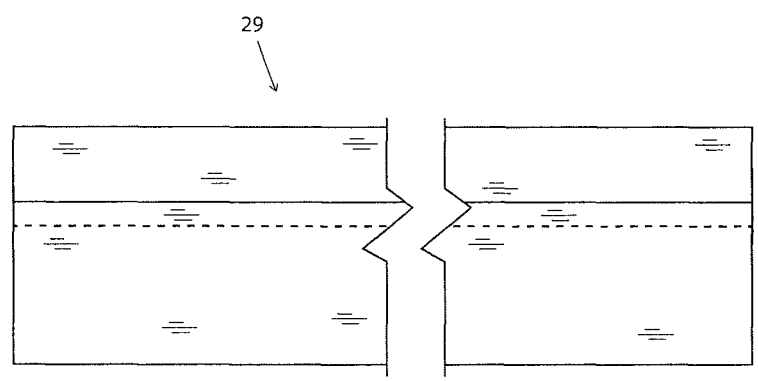
FIG. 13 is a top perspective view of another embodiment of a door jamb according to the FIGS. 2 and 3.
Figure 14:
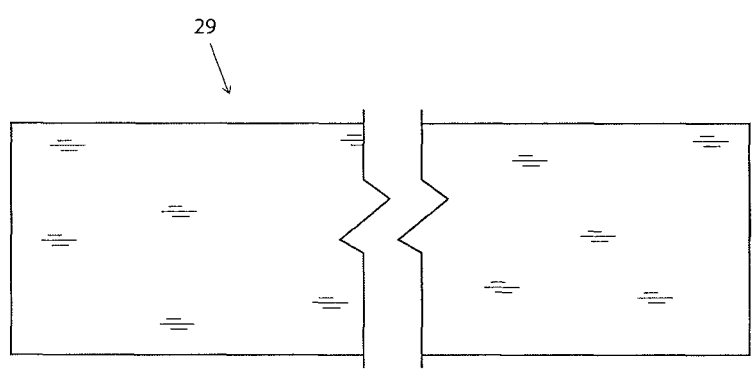
FIG. 14 is a side perspective view of another embodiment of a door jamb according to the FIGS. 2 and 3.
Figure 15:
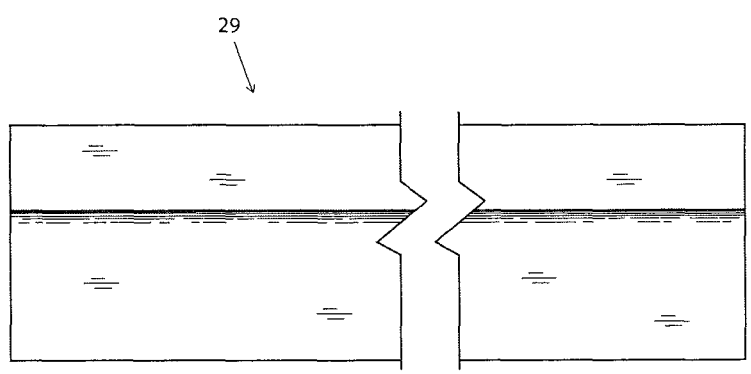
FIG. 15 is an opposite side perspective view of another embodiment of a door jamb according to the FIGS. 2 and 3.

Also disclosed is a new, original and ornamental design for a door jamb and mullion, of which the following is a specification, reference being had to the accompanying drawings in general and specifically, FIG. 1 showing a front elevation view of one embodiment of a door assembly; FIG. 2 showing an end perspective view of one embodiment of a frame member, for example, a jamb, having a core and a two-piece top piece; FIG. 3 showing an end cross-sectional view of the frame member, for example a jamb; FIG. 6 showing a front elevation view of an embodiment of a door assembly; FIG. 7 showing a front elevation view of a door assembly; FIG. 8 showing an end cross-sectional view of an embodiment of a frame member, for example a jamb, having a core, a two-piece top piece and capping; FIG. 12 showing a side perspective view of an embodiment of a door jamb; FIG. 13 showing a top view of an embodiment of a door jamb; FIG. 14 showing a side view of an embodiment of a door jamb; and FIG. 15 showing an opposite side view of an embodiment of a door jamb.

Certain modifications and improvements will occur to those skilled in the art upon a reading of the foregoing description. By way of example, the top piece can be of a unitary construction. The thickness of the top piece can be less than 10% of the total thickness in other embodiments. The plastic portion of the top piece may comprise all polyvinyl chloride. Moreover, the top piece can be made of plastic without cellulosic filler, with another type of filler, or include a blowing agent. Alternatively, the core's lower portion may be made from plastic without cellulosic filler, with another type of filler, or include a blowing agent. It should be understood that all such modifications and improvements have been deleted herein for the sake of conciseness and readability but are properly within the scope of the following claims.

We claim:

1. A frame member for a door assembly, said frame member comprising:
   a core having a first end, a second end, and a top side including at least one raised portion; and
   a two-piece top piece adjoining adjacently and directly to said core to form a structural member with said core, and wherein said two-piece top piece is a composite of a first material and a plastic material, and said two-piece top piece extends along a top side of said core to cover said core along the top side and along each of the first end and the second end of said core to cover said core along the first end and the second end, and each piece of the two-piece top piece terminating in an end segment overlapping with the end segment of the other piece of the two-piece top piece such that the raised portion of the core is uncovered adjacent to the overlapping end segments of the two-piece top piece.

2. The frame member according to claim 1, wherein said core is formed of a non-metallic material.

3. The frame member according to claim 2, wherein said core is wood.

4. The frame member according to claim 3, wherein the core further includes a lower portion formed of a decay resistant material.

5. The frame member according to claim 4, wherein said lower portion formed of a decay resistant material is a cellulosic-plastic composite.

6. The frame member according to claim 5, wherein said first material includes at least a cellulosic portion.

7. The frame member according to claim 5, wherein said plastic portion of said cellulosic-plastic composite is a thermoplastic.

8. The frame member according to claim 1, wherein said two-piece top piece includes a stop portion and a rabbet portion.

9. The frame member according to claim 8, wherein said stop portion and said rabbet portion are each generally U-shaped and the proximate end of said stop portion overlaps the corresponding proximate end of said rabbet portion.

10. The frame member according to claim 9, wherein the overlapping adjacent ends of said rabbet portion and said stop portion form a weather strip slot.

11. The frame member according to claim 8, wherein said stop portion and said rabbet portion are each generally U-shaped and the distal ends of said stop portion and said rabbet portion each overlap the sides of the underlying core.

12. The frame member according to claim 1, wherein said two-piece top piece is formed of a decay resistant material.

13. The frame member according to claim 12, wherein said two-piece top piece is a cellulosic-plastic composite.

14. The frame member according to claim 12, wherein the amount of cellulosic material in said cellulosic-plastic composite is between 20 wt. % and 70 wt. % of the weight of said cellulosic-plastic composite.

15. The frame member according to claim 14, wherein the amount of cellulosic material in said cellulosic-plastic composite is between 25 wt. % and 45 wt. % of the weight of said cellulosic-plastic composite.

16. The frame member according to claim 15, wherein the amount of cellulosic material in said cellulosic-plastic composite is 35 wt. %+/−5% of the weight of said cellulosic-plastic composite.

17. The frame member according to claim 1, wherein the thickness of the two-piece top piece is between 10% and 50% of the thickness of said frame member.

18. The frame member according to claim 1 wherein a first piece of said two-piece top piece includes a distal end covering a distal end of said core, said distal end of said first piece extending in an L-shape over a top of the core and having a proximal end terminating at a raised portion of the core; and
- a second piece of said two-piece top piece having a second distal end covering an opposite distal end of said core, said second distal end extending in an L-shape over the raised portion of the core to a second piece proximate end, the second piece proximate end terminating in an overlapping and non-planar position with the proximate end of the first piece.

19. A frame member for a door assembly, said frame member comprising:
- a core having a first end a second end, and a raised portion comprising an edge extending vertically from the core; and
- a top piece comprising a first piece and a second piece, the top piece adjoining directly to said core to form a structural member with said core and wherein said top piece is a composite of a first material and a plastic material,
- wherein the first piece adjoins directly to the first end of said core and the second piece adjoins directly to the second end of said core such that the first piece and the second piece are discontinuous with one another to expose a portion of the edge.

20. A frame member for a door assembly, the frame member comprising:
- a core having a first end, a second end, and a top side including at least one raised portion; and
- a cover formed of a composite of a first material and a second material, the cover comprising a rabbet piece and a stop piece, the rabbet piece adjoining to the core along the top side and the first end, and the stop piece adjoining to the core along the at least one raised portion of the top side and the second end, the rabbet piece and the stop piece discontinuous with each other such that the rabbet piece and the stop piece overlap with one another to expose a portion of the top side.

* * * * *